United States Patent
Buck (10) Patent No.: US 12,433,727 B1
(45) Date of Patent: Oct. 7, 2025

(54) DENTAL IMPLEMENT HOLDER

(71) Applicant: Shiloh Roots, LLC, Greensboro, NC (US)

(72) Inventor: Melissa Buck, Greensboro, NC (US)

(73) Assignee: Shiloh Roots, LLC, Greensboro, NC (US)

( * ) Notice: Subject to any disclaimer, the term of this patent is extended or adjusted under 35 U.S.C. 154(b) by 272 days.

(21) Appl. No.: 18/069,261

(22) Filed: Dec. 21, 2022

(51) Int. Cl.
*A61C 15/04* (2006.01)

(52) U.S. Cl.
CPC .................. *A61C 15/046* (2013.01)

(58) Field of Classification Search
CPC ....... A61C 15/02; A61C 15/04; A61C 15/046; A46B 15/0071; A46B 15/0073
See application file for complete search history.

(56) References Cited

U.S. PATENT DOCUMENTS

| | | | | |
|---|---|---|---|---|
| 2,554,526 A | * | 5/1951 | Dembenski | A61C 15/046 242/588 |
| 3,848,613 A | * | 11/1974 | Sheehan | A61C 15/046 132/326 |
| 4,004,599 A | * | 1/1977 | Rosenfeld | A61C 15/046 132/325 |
| D257,402 S | * | 10/1980 | Denton | D28/67 |
| 4,308,880 A | * | 1/1982 | Graves | A61C 15/043 132/321 |
| 4,327,755 A | * | 5/1982 | Endelson | A61C 15/043 225/6 |
| 4,727,895 A | * | 3/1988 | Berarducci | A61C 15/046 132/323 |
| 4,807,752 A | * | 2/1989 | Chodorow | A61C 15/043 206/820 |
| D311,259 S | * | 10/1990 | Smith | D28/67 |
| 5,156,311 A | * | 10/1992 | Spencer, Jr. | A61C 15/043 225/41 |
| 5,228,595 A | * | 7/1993 | Booker | A47K 5/00 222/129 |
| D371,223 S | * | 6/1996 | Van Halteren | D28/66 |
| D380,376 S | * | 7/1997 | Reinhardt | D9/624 |
| D431,879 S | * | 10/2000 | Perlin | D28/67 |
| 6,152,147 A | | 11/2000 | Sanchez | |
| D449,711 S | * | 10/2001 | Harlocker | D28/67 |
| D456,566 S | * | 4/2002 | Chodorow | A61C 15/046 D28/67 |

(Continued)

*Primary Examiner* — Rachel R Steitz
*Assistant Examiner* — Karim Asqiriba
(74) *Attorney, Agent, or Firm* — Tuggle Duggins P.A.; Blake P. Hunt (57) ABSTRACT

A dental implement holder for receiving the narrow ends of floss threaders. The dental implement holder defines a top surface and a bottom surface. A plurality of through holes extend from the top surface through the bottom surface. Each of the plurality of through holes is configured to receive a narrow end of a floss threader. Each of the plurality of through holes defines a length greater than the length of a narrow portion of a floss threader so that once inserted, the narrow end does not contact the surface the dental implement holder is resting on, preventing contamination. The plurality of through holes facilitates easy cleaning of the dental implement holder by flushing the through holes with water and/or cleaning solution to remove debris and unwanted contaminants.

17 Claims, 7 Drawing Sheets

(56) References Cited

U.S. PATENT DOCUMENTS

| | | | | |
|---|---|---|---|---|
| D469,220 S | * | 1/2003 | Mercier, Jr. | D28/67 |
| D469,925 S | * | 2/2003 | Salecker | D28/67 |
| D641,523 S | * | 7/2011 | Nanda | D28/66 |
| D716,499 S | * | 10/2014 | Li | D28/66 |
| 2004/0048231 A1 | * | 3/2004 | Perlin | G09B 19/0084 |
| | | | | 434/263 |
| 2010/0006120 A1 | * | 1/2010 | Shen | A61C 15/046 |
| | | | | 132/325 |
| 2013/0133687 A1 | * | 5/2013 | Dales | A61C 15/046 |
| | | | | 132/327 |
| 2015/0079242 A1 | * | 3/2015 | Jones | A23G 1/507 |
| | | | | 426/134 |
| 2022/0217484 A1 | * | 7/2022 | Wilburn, Sr. | C09D 133/16 |

* cited by examiner

PRIOR ART

DENTAL IMPLEMENT HOLDER

FIELD OF THE INVENTION

The disclosure herein pertains to dental equipment, specifically to a dental implement holder for holding dental flossing equipment and associated accessories.

DESCRIPTION OF THE PRIOR ART AND OBJECTIVES OF THE INVENTION

Flossing should be a necessary component of any one person's dental routine, though it is often neglected by many. The use of dental floss is well-known and extensive both by individuals when cleaning their own teeth and gums and also by professionals, such as dental hygienists, when performing a detailed cleaning and flossing process during periodic visits to the dentist.

Good flossing habits and techniques can be especially important for people with dental implants (such as but not limited to tooth implants, bridges or dentures), braces, and the like. Often, due to the geometry of these structures, conventional brushing may not reach surfaces that are prone to accumulation of plaque and food debris, surfaces such as those between the structures and gums or between the structure and teeth. Flossing remains an effective way to limit or rid these surfaces of plaque and debris; however, effectively threading dental floss through these structures to reach those surfaces can present substantial challenges, even to trained hygienists, due to the flimsy, deformable nature of dental floss, the moist surfaces of gums, teeth and structures, and the often extremely narrow openings that the floss needs to be threaded through to access plaque and debris prone surfaces. Floss threaders, as known in the art, were developed to solve this problem. A floss threader functions similarly to a sewing needle: one end has an opening much like the eye of a needle and receives dental floss therein that is knotted to the opening and another end that is narrow and flexible, but substantially more rigid than an end of dental floss. The narrow end of the floss threader is inserted into openings between a structure and gums, or teeth, and pulled through with dental floss in tow. After the floss threader is completely pulled through, the person is free to pull the dental floss in tension to remove any plaque or debris from a surface.

The utility and low cost of floss threaders have rendered them a staple to most dental practices and many households. Accordingly, some structures have been developed to store floss threaders. Floss threaders are typically packaged in small envelopes; however, this form of storage is undesirable as it may be difficult to remove individual floss threaders from an envelope while a dental professional is wearing gloves and without touching other floss threaders. Some products have been developed to store floss threaders that have already been removed from their packaging, however these products are also undesirable as they require that the floss threaders be held by the wide portion, requiring the dental professional to remove the floss threaders by grabbing the narrow portion of the floss threader with a gloved hand, risking contamination of the adjacent floss threaders. Further, due to the spaced about nature of the apertures for holding the floss threaders, these products are less space efficient, which is undesirable as dental offices are typically cramped environments.

Thus, in view of the problems and disadvantages associated with prior art devices, the present disclosure was conceived and one of its objectives is to provide a dental implement holder configured to receive a narrow portion of a floss threader.

It is another objective of the present disclosure to provide a dental implement holder with a plurality of through holes that extend from a top surface to a bottom surface.

It is still another objective of the present disclosure to provide a dental implement holder with indicia to facilitate an approach response of a patient.

It is yet another objective of the present disclosure to provide a dental implement holder with a plurality of through holes that define a length greater than a length of a narrow portion of a floss threader so that a narrow end of the floss threader does not contact a surface that the dental implement holder is resting on.

It is a further objective of the present disclosure to provide a dental implement holder that is configured to store at least fifteen floss threaders It is still a further objective of the present disclosure to provide a dental implement holder that is space efficient, configured to hold at least fifteen floss threaders while only requiring a top surface area of nine square inches or less.

Various other objectives and advantages of the present disclosure will become apparent to those skilled in the art as a more detailed description is set forth below.

SUMMARY OF THE INVENTION

The aforesaid and other objectives are realized by providing a dental implement holder with a top surface and bottom surface. The top surface defines a groove, the top surface and groove may be sized and shaped to resemble the occlusal surface of a human molar tooth. The dental implement holder defines a plurality of through holes that extend from the top surface through the bottom surface. Each of the plurality of through holes is configured to receive a narrow portion of a floss threader and the top surface is configured to support a wide portion of the floss threader. Each of the plurality of through holes defines a length greater than a length of a narrow portion of a floss threader so that the narrow end of the floss threader does not contact the surface that the holder is resting upon when the narrow end of the floss threader is inserted into one of the plurality of holes. The plurality of through holes may be cleaned of debris and pathogens by flushing the plurality of through holes with a cleaning solution, allowing the solution to drain through the plurality of through holes. The bottom surface may include two legs each with a flat portion to increase stability of the holder. The dental implement holder defines a front surface with indicia configured to activate an approach response in patients.

DETAILED DESCRIPTION OF THE PREFERRED EMBODIMENT AND OPERATION OF THE INVENTION

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Figure 1:
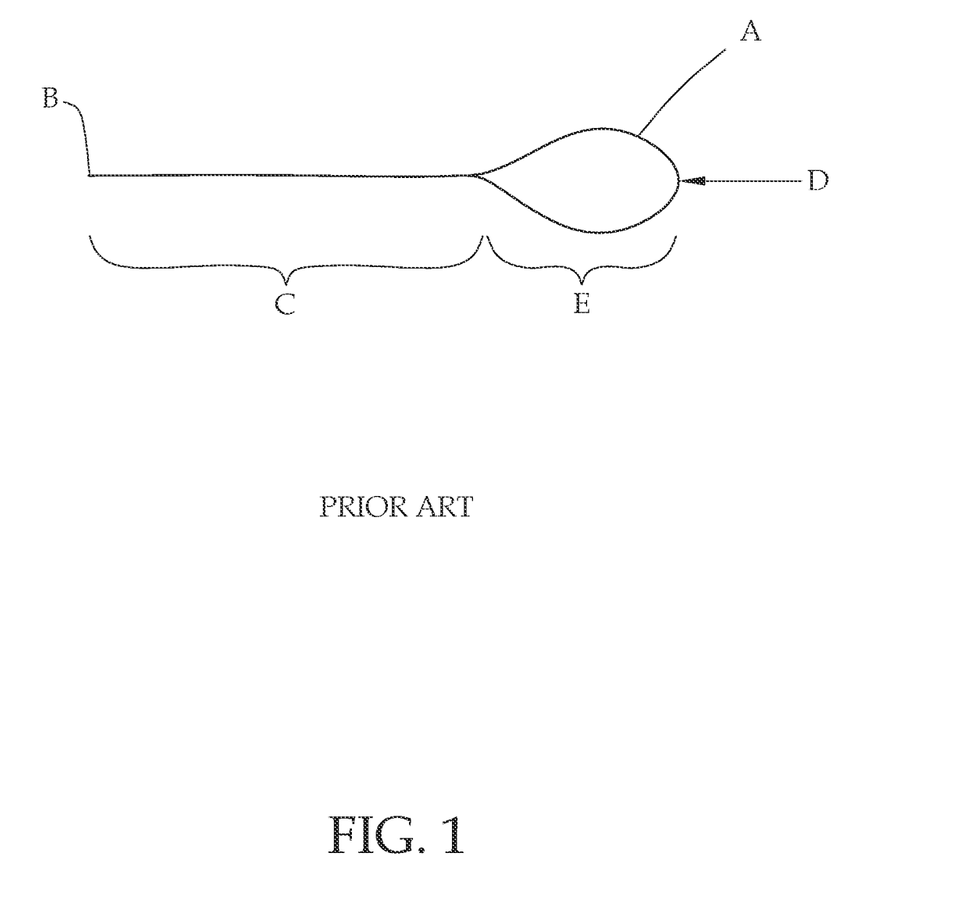
FIG. 1 diagrams a plan view of a prior art floss threader.

For a better understanding of the disclosure and its operation, turning now to the drawings, FIG. 1 presents a floss threader A which is known in the prior art. The floss threader A defines a wide portion E and a narrow portion C. The wide portion E and narrow portion C are positioned opposite one another. The wide portion E is a loop structure configured to have dental floss looped through and/or tied to the wide portion E. The wide portion E includes a wide end D and the narrow portion C includes a narrow end B, the wide end D and narrow end B are positioned opposite from one another. The floss threader A is formed from a flexible, yet slightly rigid material. Narrow portion C is configured to be inserted into a desired opening within a patient's mouth.

Figure 2:
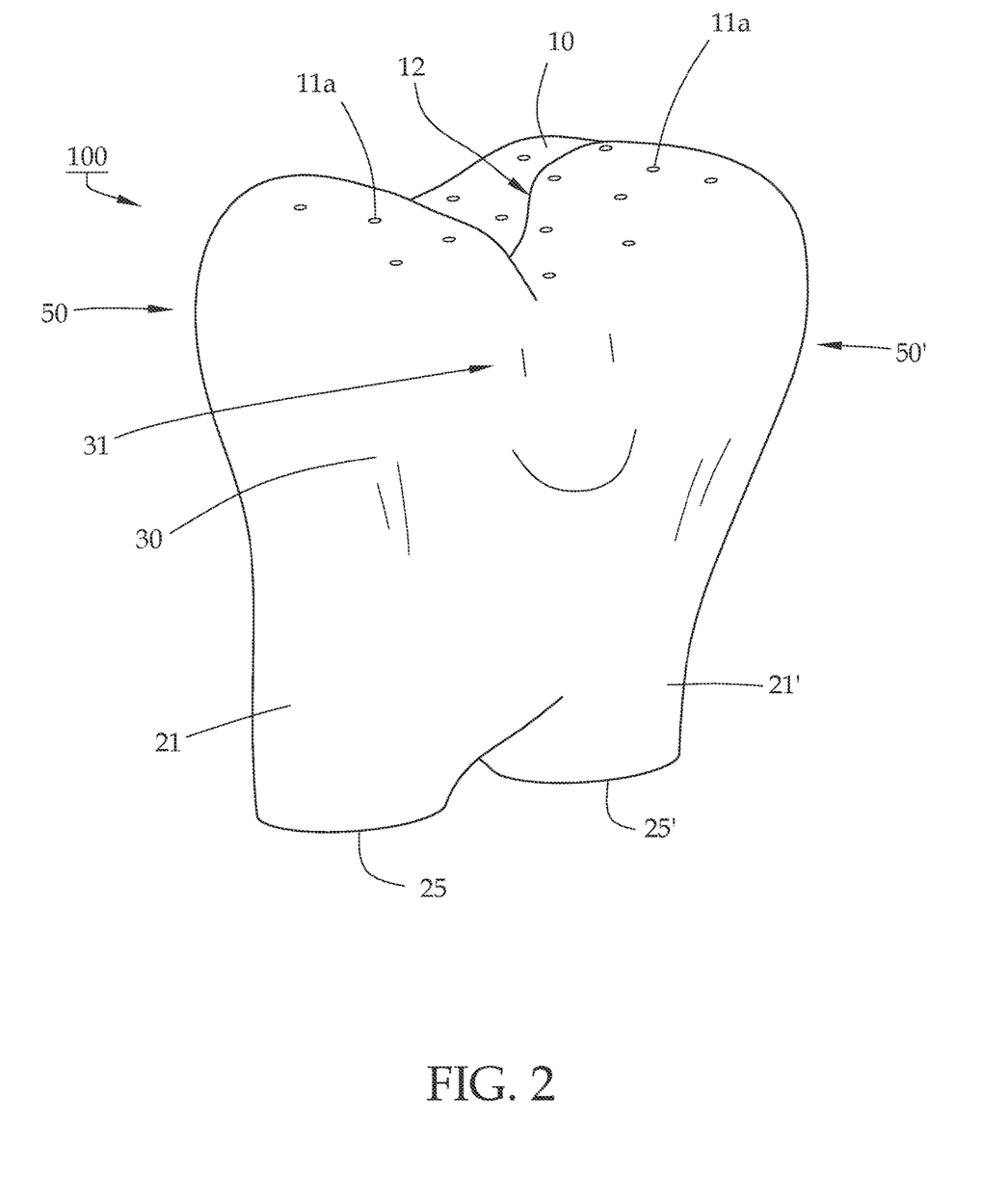
FIG. 2 shows a perspective view of a dental implement holder.
Figure 4:
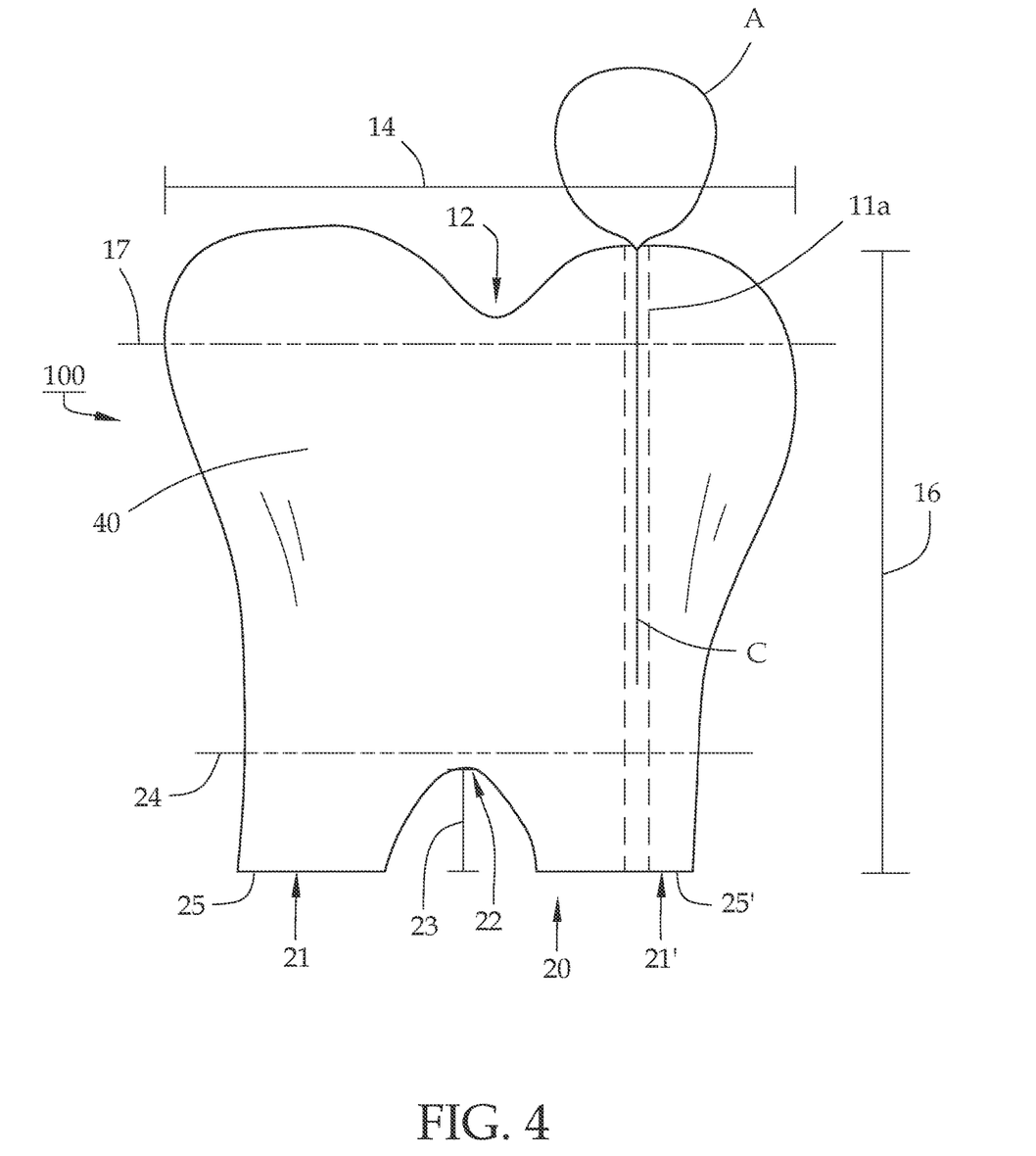
FIG. 4 depicts a plan view of a rear surface of the dental implement holder.
Figure 5A:
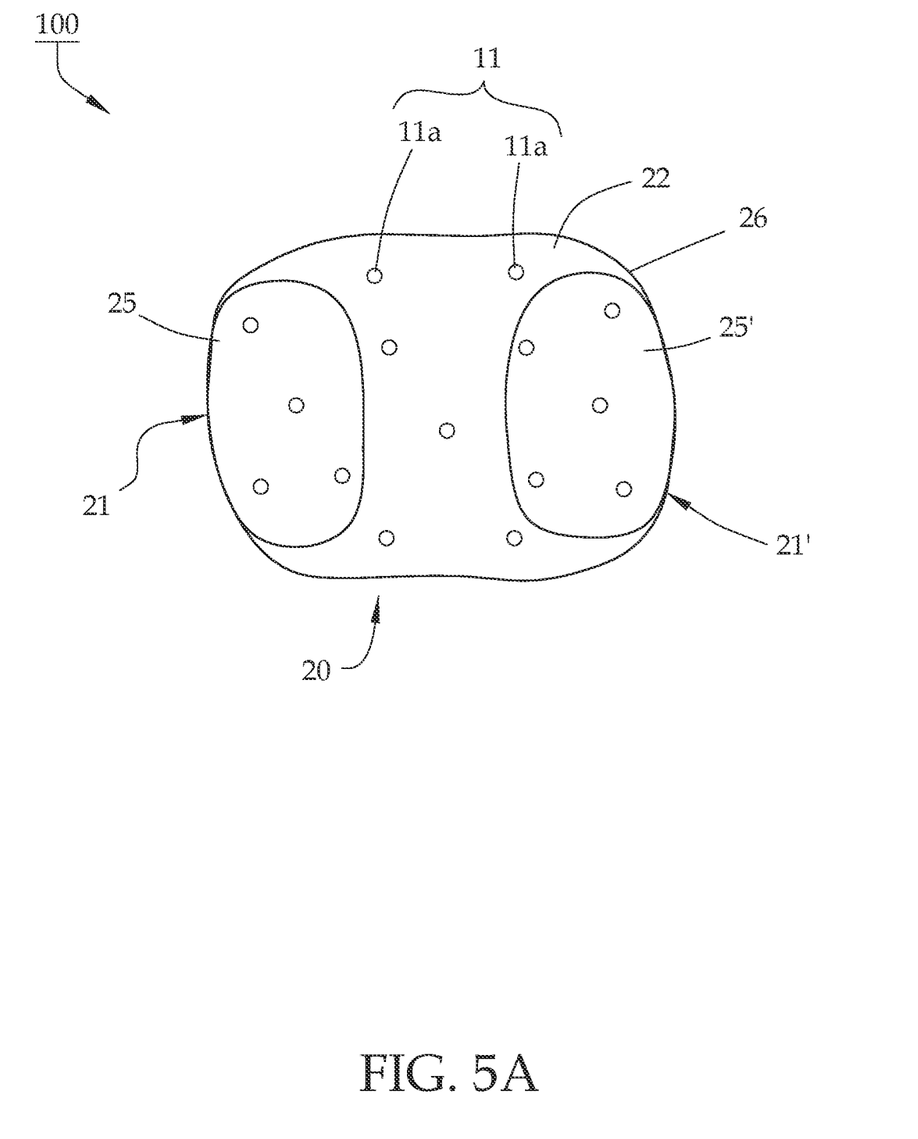
FIG. 5A demonstrates a plan view of a bottom surface of the dental implement holder.
Figure 5B:
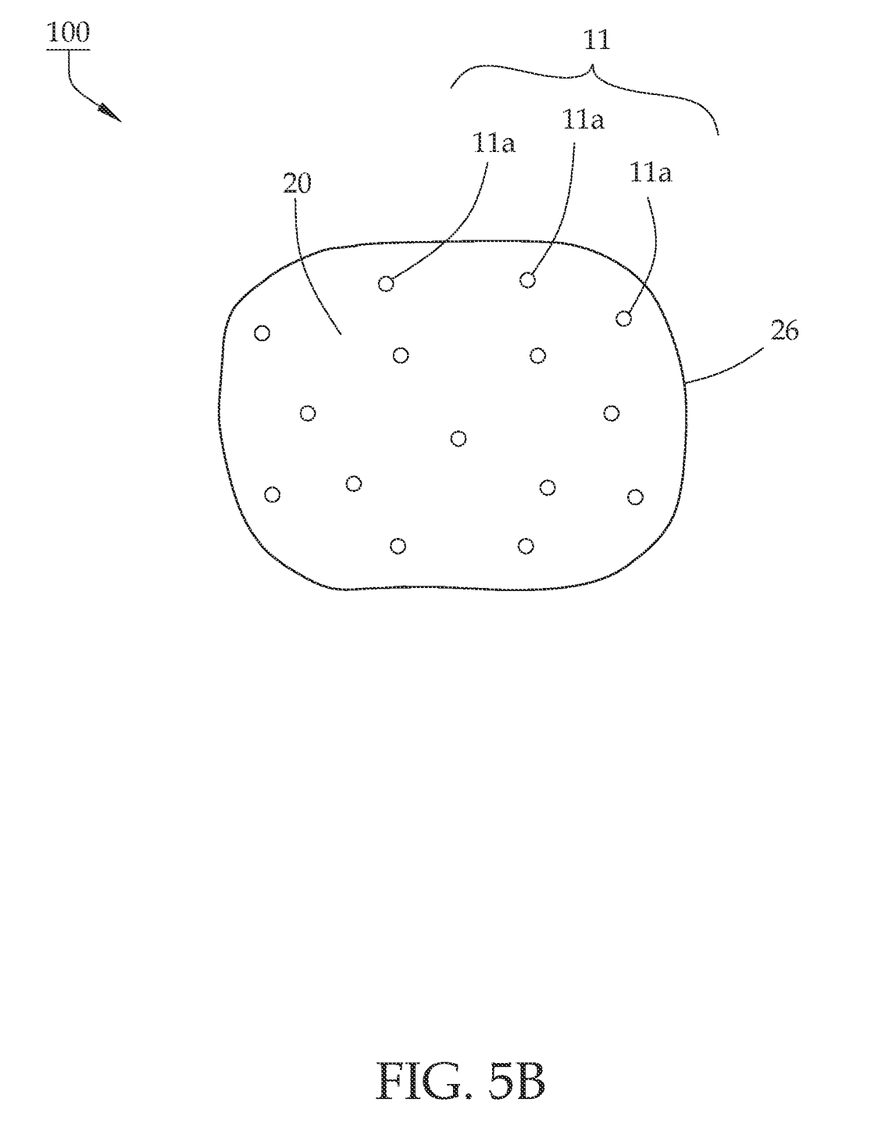
FIG. 5B illustrates a plan view of an alternate embodiment of the bottom surface of the dental implement holder.

FIG. 2 illustrates a perspective view of the dental implement holder 100. The dental implement holder 100 is formed from a front surface 30, a rear surface 40, two side surfaces 50, 50', a top surface 10, and a bottom surface 20 (as seen in FIGS. 4, 5A, 5B). The preferred holder 100 is configured to generally resemble a human tooth, for example a molar. The top surface 10 defines a plurality of through holes 11, preferably fifteen individual holes 11a. The individual holes 11a of the plurality of through holes 11 are each configured to receive a dental implement. In one or more embodiments, as would be understood, although not shown the number of through holes 11 could be more or less than fifteen.

In the preferred embodiment, each one of the individual holes 11a forming the plurality of through holes 11 are configured to receive a floss threader A (seen individually in FIG. 1), preferably a narrow portion C of the floss threader A that is configured to be the leading end of the floss threader A that is inserted first into openings within a patient's mouth. In one or more embodiments, the individual holes 11a forming the plurality of through holes 11 are each about 1.25 millimeters in diameter (+/−0.5 millimeters), but preferably are 1.25 millimeters in diameter. The top surface 10 may be configured to support a wide portion E of the floss threader A (as best seen in FIG. 4). The holder 100 is configured so that a floss threader A deposited in one of the individual holes 11a may be retrieved by a small non-contaminated instrument, such as but not limited to a cotton tip applicator, (not shown). In use, the cotton tip applicator may be inserted through the wide portion E, hooking the floss threader A for easy removal. In some embodiments, depending on the spacing of the plurality of through holes 11, contamination of adjacent floss threaders A may occur if a gloved hand were used in the removal of a floss threader A instead of a small non-contaminated instrument.

In one or more embodiments, the front surface 30 of the dental implement holder 100 may include indicia 31. The indicia 31 may be an aesthetically appealing design, such as a smiling face or a happy face to increase the marketability of the holder 100 and alleviate patient anxiety. Studies have shown that smiling or happy faces may have strong motivational power and may activate approach reactions. A significant portion of Americans have some sort of dental phobia ("dentophobia" or "odontophobia"), and 10% of the population avoid dentists altogether. Studies also show that those with dental phobia have worse oral health than people with a positive view of the dentist. Accordingly, including indicia 31 such as a smiling or happy face may alleviate patient anxiety and/or stress when a patient views the indicia 31 while getting their teeth cleaned or examined and may help patients increase positive associations with dental care and may activate approach reactions in patients.

Figure 3:
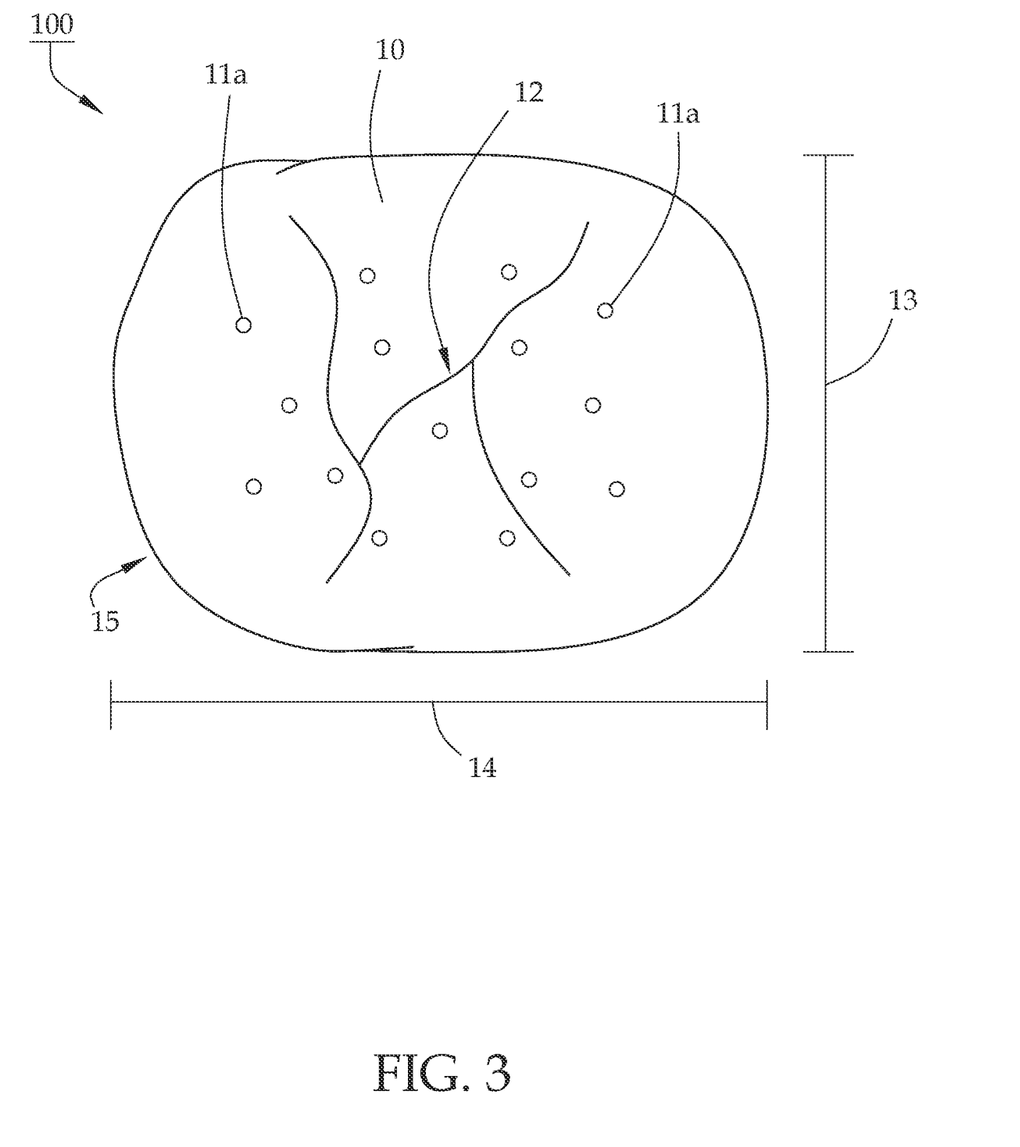
FIG. 3 pictures a plan view of a top surface of the dental implement holder.
Figure 6:
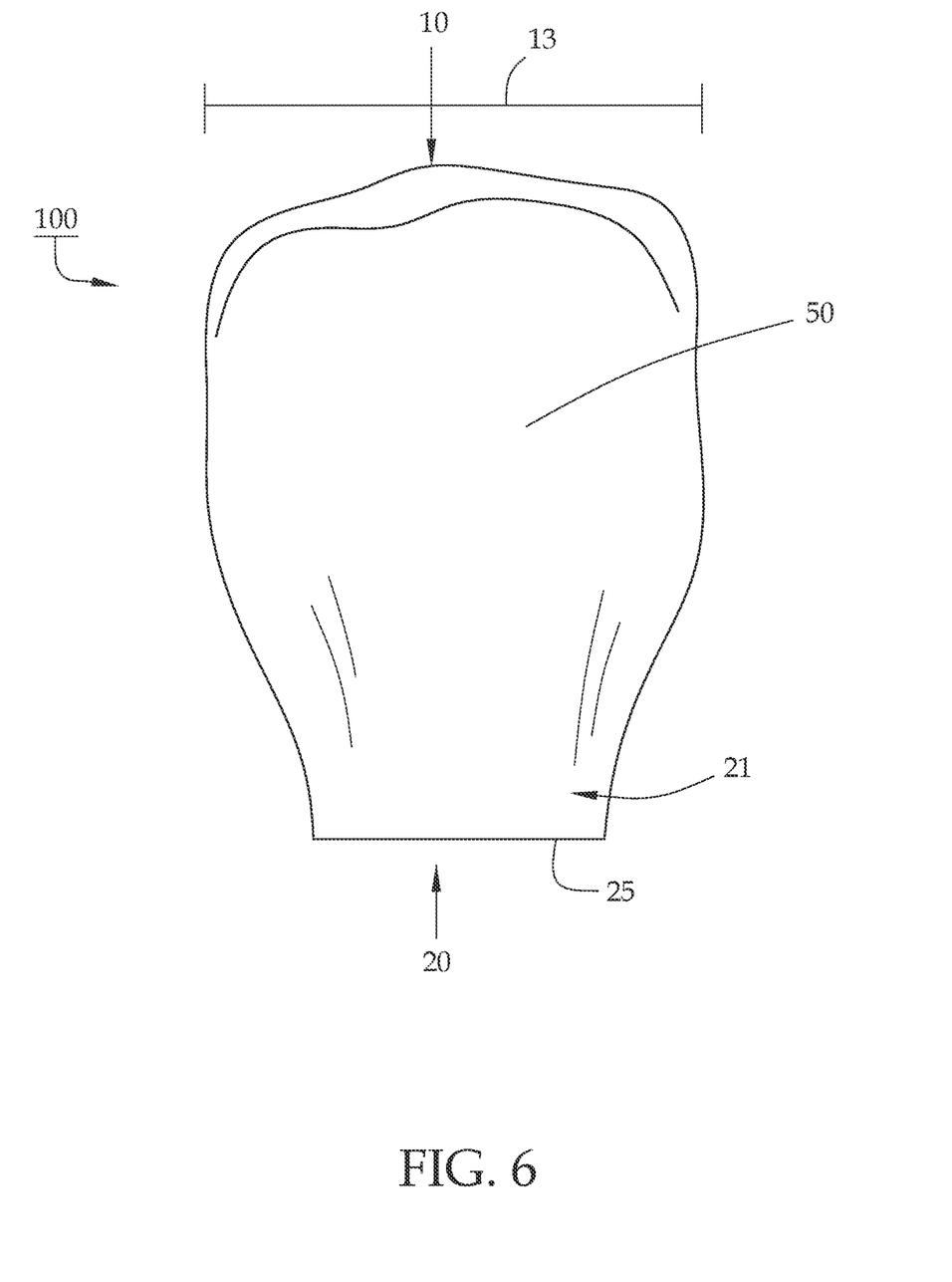
FIG. 6 features a plan view of a side surface of the dental implement holder.

Still referring to FIG. 2, but with additional reference to FIGS. 3, 4, and 6, the holder 100 defines a front surface 30, side surface 50, 50' and rear surface 40. In some embodiments, front surface 30, side surfaces 50, 50', and/or rear surface 40 may define substantially convex surfaces. In the preferred embodiment, the front surface 30, side surfaces 50, 50', rear surface 40, top surface 10 and bottom surface 20 are sized and shaped to generally resemble a human molar tooth or stylized version thereof.

The dental implement holder 100 defines a top plane 17, the surface area above the top plane 17 is the top surface 10. In embodiments with a groove 12 (as also seen in FIG. 3), the top plane 17 is positioned at the deepest point of a groove 12 and is parallel with a horizon (not shown). In other embodiments without groove 12, the top surface 10 is planar and the top plane 17 is parallel with top surface 10. In embodiments where the bottom surface 20 defines a depression 22, the bottom surface 20 is the surface area below a bottom plane 24 positioned at the point of inflection of depression 22 and the bottom plane 24 is parallel to the top plane 17. In embodiments with depression 22, the surface area between the bottom plane 24 and top plane 17 forms front surface 30, rear surface 40 and two side surfaces 50, 50'. In embodiments where the bottom surface 20 is planar, the surface area between a bottom plane 24 defined by bottom surface 20 and top plane 17 forms front surface 30, rear surface 40 and two side surfaces 50, 50'.

As seen in FIG. 3, the holder 100 defines a top surface 10. The top surface 10 includes a plurality of through holes 11 that are each sized and shaped to receive a narrow portion of a dental implement, preferably the narrow portion C of floss threader A. The top surface 10 defines a major axis 14 and a minor axis 13. In the preferred embodiment, the major axis 14 is about 2.5 inches (+/−1 inch) and the minor axis 13 is about 1.5 inches (+/−1 inch). In alternative embodiments, the major axis 14 and minor axis 13 may be the same length. In the preferred embodiment, the top surface 10 may define groove 12 with geometry that mimics the cusps, grooves, pits, and offsets of a human molar tooth and/or mimics the occlusal surface of a molar tooth. The occlusal surface of a tooth is defined as the top surface of a tooth. The periphery 15 of the top surface 10, depending on the lengths of the major axis 14 and minor axis 13, may be shaped as a rectangle with rounded corners or a square with round corners, however in some embodiments the periphery 15 may be substantially circular or ovular.

FIG. 4 shows the rear surface 40 of the holder 100. The rear surface 40, side surfaces 50, 50', and front surface 30 are shaped to resemble a tooth, and specifically may be shaped to resemble a human molar tooth. The rear surface 40, side surfaces 50, 50', and front surface 30 may be at their widest near the top surface 10. Each surface, 30, 40, 50, 50' may define a maximum width of about 2.9 inches (+/−0.5 inches) near the top surface 10. The holder 100 defines a height 16.

In the preferred embodiment, the individual holes 11a of the plurality of holes 11 are through holes that extend from the top surface 10 through bottom surface 20. It is desirable to employ through holes instead of blind holes because it facilitates efficient cleaning of the holder 100. A solution may be flushed through the individual holes 11a to quickly remove debris that may accumulate within the plurality of holes 11. Additionally, cleaning or sterilizing solutions may be flushed through the individual holes 11a to kill and/or remove harmful bacteria, fungal spores, allergens, and other unwanted pathogens. The individual holes 11a may be configured to be greater in length than a narrow portion C of a floss threader A so that the narrow end B does not come into contact with a surface that the holder 100 is positioned on when a narrow end B of the floss threader A is inserted into any one of the individual holes 11a (see the phantom lines and floss threader A in FIG. 4). Preventing of narrow end B from contacting the surface that the holder 100 is positioned on may reduce the risk of pathogens and/or unwanted materials accumulating on the narrow portion C of the floss threader A. Although not shown, the rear surface 40 may include indicia in a similar manner to the front surface 30 and may be a logo. In some embodiments, the height 16 of the holder 100 may be about 2.5 inches (+/−1 inch) from the point of the top surface 10 most distal from a portion of the bottom surface 20 in contact with a surface the holder 100 is resting on. As would be understood, although not shown, the length of the through holes 11 may have minimal variations dependent on the geometry of the top surface 10 and bottom surface 20 with respect to the configuration of groove 12, depression 22, and legs 21, 21' however the length of the through holes will still be longer than the narrow end B of floss threader A.

In some embodiments, the bottom surface 20 may define two legs 21, 21'. The legs 21, 21' are sized and shaped so that the holder 100 remains in an upright position when placed on a surface. Each leg 21, 21' may include a flat portion 25, 25' to increase the amount of surface area of the leg 21, 21' in contact with the surface that the holder 100 is resting upon, thereby increasing the amount of horizontal force necessary to displace the holder 100 and preventing the holder 100 from tipping over. Alternative embodiments, not shown, may include four legs, one leg positioned at each corner of the bottom surface 20.

FIG. 5A shows the preferred embodiment of the holder 100 where the bottom surface 20 may include a depression 22. The preferred depression 22 may define a maximum depth 23 (as seen in FIG. 4) that is about 0.7874 inches (+/−0.25 inches) from the surface the holder 100 is resting upon at the center. Including the depression 22 may be desirable to reduce the amount of material necessary to create holder 100. In the preferred embodiment, the holder 100 may define a weight of about 10 oz (+/−5 oz). The preferred holder 100 may be formed from a resin, plastic, latex, silicone, or other similar light weight material. Additionally, it may be desirable to include depression 22 to increase the aesthetic appeal of the holder 100 by further increasing the holder's resemblance to a molar tooth, as molar teeth may have similar depressions when extracted. The bottom surface 20 defines corresponding openings to individual holes 11a of the plurality of holes 11. The flat portions 25, 25' of the legs 21, 21' may be desirable to prevent holder 100 from tipping in the direction of the front surface 30 and/or rear surface 40. The preferred distance between the most distal point of each leg 21, 21' relative to one another is about 2 inches (+/−0.5 inches). In some embodiments, it may be desirable for the periphery 26 defined by the bottom surface 20 to be substantially similar in size and shape to the periphery 15 defined by the top surface 10 to increase stability of the holder 100 relative to the surface it is resting on.

FIG. 5B shows an alternative embodiment of the holder 100 where the bottom surface 20 is planar. This embodiment does not have legs 21, 21'. A flat bottom surface 20 may be desirable to further increase the amount of surface area in contact with the surface that the holder 100 is resting upon, further increasing the amount of horizontal force necessary to displace the holder 100. Further, the planarity of bottom surface 20 may increase the stability of the holder 100 reducing the risk that the holder 100 may tip over from a horizontal force in the direction of any of the surfaces. In this alternative embodiment, the bottom surface 20 of the holder 100 may define a major axis that is about 2 inches (+/−0.5 inches) in length. In some embodiments, it may be desirable for the periphery 26 defined by the bottom surface 20 to be substantially similar in size and shape to the periphery 15 defined by the top surface 10 to increase stability of the holder 100 relative to the surface it is resting on.

FIG. 6 shows a side surface 50 of the holder 100. In some embodiments, the side surfaces 50, 50' may be generally narrower than the front surface 30 and rear surface 40 resulting in two wide sides and two narrow sides. In other embodiments, the side surfaces 50, 50' may be identical or nearly identical in size and shape to front surface 30 and rear surface 40, resulting in four equally wide or nearly equally wide sides. It may be more desirable that front surface 30, rear surface 40, and side surfaces 50, 50' are identical in terms of size and shape as this may result in a more stable bottom surface 20 irrespective of whether the bottom surface includes legs 21, 21' or is planar.

The illustrations and examples provided herein are for explanatory purposes and are not intended to limit the scope of the appended claims.

I claim:

1. A dental implement holder (100) comprising:
    a floss threader holder defining a shape of a human tooth, including a top surface (10), a bottom surface (20), a front surface (30), a rear surface (40), and two side surfaces (50, 50'); and
    a plurality of through holes (11) formed in the top surface (10), each of the plurality of through holes (11) defining a height, said height defined as a distance extending from the top surface (10) through the bottom surface (20), wherein at least one of the plurality of through holes (11) extends along the height, and wherein the plurality of through holes (11) are each configured to receive a narrow portion (C) of a floss threader (A) therein, orienting the floss threader (A) in a substantially vertical orientation that, as a function of the height, positions a wide portion (E) of the floss threader (A) beyond the top surface (10) of the floss threader holder.

2. The dental implement holder (100) of claim 1, wherein the height is greater than a length of the narrow portion (C) of the floss threader (A).

3. The dental implement holder (100) of claim 2, wherein the bottom surface (20) defines two legs (21, 21') positioned opposite one another.

4. The dental implement holder (100) of claim 3, wherein the two legs (21, 21') each define a flat portion (25, 25') for increasing stability of the dental implement holder.

5. The dental implement holder (100) of claim 4, wherein a major axis defined by the top surface (10) is equal to a minor axis (13) defined by the top surface (10).

6. The dental implement holder (100) of claim 5, wherein the major axis (14) and the minor axis (13) each define a length of 2.5 inches.

7. The dental implement holder (100) of claim 4, wherein the top surface (10) defines a groove (12) configured to resemble an anatomy of cusps, grooves, pits, and/or offsets of a human molar tooth, wherein the bottom surface (20) is planar, and wherein the dental implement holder (100) defines a front surface (30), wherein the front surface (30) includes indicia (31).

8. The dental implement holder (100) of claim 2, wherein the bottom surface (20) is planar.

9. The dental implement holder (100) of claim 1, wherein the top surface (10) defines a groove (12) configured to resemble an anatomy of cusps, grooves, pits, and/or offsets of a human molar tooth.

10. The dental implement holder (100) of claim 9, wherein a major axis (14) defined by the top surface (10) is 2.5 inches, and a minor axis (13) defined by the top surface (10) is 1.5 inches.

11. The dental implement holder (100) of claim 10, wherein the dental implement holder (100) defines a height (16) of 2.5 inches.

12. The dental implement holder (100) of claim 11, wherein the front surface (30) includes indicia (31).

13. The dental implement holder (100) of claim 12, wherein each of the plurality of through holes (11) is 1.25 mm in diameter.

14. The dental implement holder (100) of claim 1, wherein the top surface (10) is planar.

15. The dental implement holder (100) of claim 14, wherein a major axis (14) defined by the top surface (10) is 2.5 inches, and a minor axis (13) defined by the top surface (10) is 1.5 inches.

16. The dental implement holder (100) of claim 15, wherein the front surface (30) includes indicia (31).

17. The dental implement holder (100) of claim 16, wherein each of the plurality of through holes (11) is 1.25 mm in diameter.

* * * * *